US008537852B2

(12) United States Patent
Golovchenko et al.

(10) Patent No.: US 8,537,852 B2
(45) Date of Patent: Sep. 17, 2013

(54) CONFIGURATION AND OPERATION OF INVERSE MULTIPLEXING COMMUNICATION SYSTEM

(75) Inventors: Ekaterina A. Golovchenko, Colts Neck, NJ (US); Sameh A. Sabet, Freehold, NJ (US)

(73) Assignee: Tyco Electronics Subsea Communications, LLC, Eatontown, NJ (US)

( * ) Notice: Subject to any disclaimer, the term of this patent is extended or adjusted under 35 U.S.C. 154(b) by 269 days.

(21) Appl. No.: 12/775,878

(22) Filed: May 7, 2010

(65) Prior Publication Data

US 2011/0274119 A1 Nov. 10, 2011

(51) Int. Cl.
*H04J 3/16* (2006.01)

(52) U.S. Cl.
USPC ................................................ 370/465

(58) Field of Classification Search
USPC ......... 370/203, 229–240, 241–253, 254–258, 370/298–306, 351–356, 357–395, 395.1, 370/395.2, 395.21, 395.3, 395.31, 395.32, 370/395.4, 395.41, 395.42, 395.43, 395.5, 370/395.52, 395.53, 395.54, 395.6, 395.61, 370/396–411, 412–429, 503–520
See application file for complete search history.

(56) References Cited

U.S. PATENT DOCUMENTS

| | | | |
|---|---|---|---|
| 5,065,396 A | 11/1991 | Castellano et al. | |
| 6,381,048 B1* | 4/2002 | Chraplyvy et al. | 398/79 |
| 6,618,374 B1* | 9/2003 | Buckland et al. | 370/394 |
| 2002/0005968 A1* | 1/2002 | Suzuki | 359/124 |
| 2003/0025971 A1 | 2/2003 | Price et al. | |
| 2003/0117945 A1* | 6/2003 | Zboril | 370/216 |
| 2003/0219019 A1* | 11/2003 | Wilson | 370/395.1 |
| 2004/0096213 A1 | 5/2004 | Perkins et al. | |
| 2004/0196798 A1 | 10/2004 | Abousleman | |
| 2006/0133523 A1 | 6/2006 | Stojanovic et al. | |
| 2008/0138066 A1 | 6/2008 | Zhu et al. | |
| 2008/0232818 A1* | 9/2008 | Narita et al. | 398/164 |
| 2008/0292316 A1* | 11/2008 | Litvin et al. | 398/79 |
| 2010/0002727 A1* | 1/2010 | Svelmoe | 370/474 |

OTHER PUBLICATIONS

International Search Report, dated Aug. 29, 2011 issued in corresponding International Application PCT/US2011/035617.

* cited by examiner

*Primary Examiner* — Jung-Jen Liu

(57) ABSTRACT

An inverse multiplexing communication path is established in at least one direction between nodes connected by a plurality of lower bandwidth bearing channels between the nodes, on which the content of a higher bandwidth signal is distributed and from which the original high bandwidth signal is recovered at the receiving node. During preliminary configuration, for example when selecting a subset of bearer channels from among a number of potential bearer channels, the bearer channels are chosen or are altered by signal processing to make the members of the subset perform similarly, thereby improving operations as compared to having the bearer channels bound to perform according to the performance of the least-performing member of the subset.

9 Claims, 3 Drawing Sheets

CONFIGURATION AND OPERATION OF INVERSE MULTIPLEXING COMMUNICATION SYSTEM

BACKGROUND OF THE INVENTION

Field of the Invention

In telecommunication systems, inverse multiplexing is where a high bandwidth data signal received at an input can be distributed into a plurality of lower bandwidth signal paths propagating in parallel between sending and receiving nodes. At the receiving node, the plural lower bandwidth signals are re-assembled or multiplexed to reproduce the higher bandwidth data signal. Inverse multiplexing uses the capacity of a number of relatively lower bit rate signal paths, or bearer channels, to form a high bit rate communications channel.

Various types of signal paths may be used for data communications having different characteristics. For example differences in signal propagation times naturally result from having different routes using different media such as optical fiber, wireless or wired connections. Also, over a given physical pathway such as a single optical fiber, channels having different wavelengths propagate at different speeds, leading to phase dispersion that accumulates over the length of the fiber.

In long haul undersea or terrestrial fiber optical transmission systems, channels are defined by wavelengths. Channels having different wavelengths have different phase dispersion characteristics. Various techniques have been used to accommodate for this differential delay as a function of wavelength (or to measure the delay) and to compensate for the associated phase dispersion. The compensation involves delaying the signals at wavelengths that propagate more quickly so that the signals arrive at the same time at a given node or destination. For example, a wavelength division multiplexed signal can be separated by wavelength into different paths having phase delays inserted in the amount necessary to offset the accumulated dispersion. This delay can be inserted at the signal launch end of the system by an interface element associated with modulation of a carrier signal. The interface element can have other controls as well, intended to optimize the performance of the respective signal path, to maintain nominal carrier and modulation amplitudes, to minimize the occurrence of data errors, etc.

It would be advantageous in an inverse multiplexing arrangement to have any inverse multiplexed leg or legs of a signal path be substantially invisible to senders and receivers of the high bandwidth signal, perceive the transmission as one high bandwidth channel between the sending and receiving nodes. It also would be advantageous to operate the transmission system efficiently, namely by making productive use of a high proportion of the total data capacity available using the various available higher and lower bandwidth channels.

An inverse multiplexing arrangement includes serial-to-parallel data format conversion of the high data rate input signal at the input node, transmission of plural parallel paths to the receiving node over lower data rate paths, and parallel-to-serial data format conversion at the receiving node. At the receiving end, the data from all the respective channels needs to be available at the same time, for example loaded into a shift register, in order to be clocked out as the reconstituted high data rate signal. If there is a differential transmission delay among the bearer channels, these channels could conceivably be limited to a low enough data rate to accommodate the slowest propagating channels. However, the slowest bearer channel is accommodated by inserting differential phase compensation delays to accommodate the faster signal paths. Signal transmission can then be carried out without depressing the data rate, but operating with a fixed delay.

The fixed signal delay depends on factors including signal propagation rates, which vary with wavelength, and the length of the transmission path, which causes rate-related differences to accumulate. When designing and configuring a transmission system, a transmission characteristic such as phase compensation for each channel to operate at a particular wavelength between particular nodes may be pre-defined. In an advantageous arrangement, a control processor can devote transmission capacity to customer requirements as a matter of provisioning that varies from time to time, including for example establishing an inverse multiplexing arrangement for provisioning a high data rate channel using a number of lower data rate bearer channels.

Signal provisioning in these communications systems may require devoting two or more wavelength bands on a particular fiber as bearer channels that will share the contents of the high bandwidth signal. Such bearer channels are typically operated at the same data rates and synchronously receive data bits in a lock-step round robin manner. If a given number of channels N of bearer channels is to cooperatively carry the content of the high data rate channel, then the bearer channels are operated at bit rates that are N times as long as the input data rate. For example, if a 40 Gb/s signal is inverse multiplexed over four bearer channels, each bearer channel is operated at 10 Gb/s. Thus, each bit of the four channels requires four times the transmission time as compared to the time devoted to the bit on the high bandwidth input and output.

Each bearer channel must be functional at the lower data rate (10 Gb/s in the above example) or the inverse multiplexed channel may experience undue data errors which may compromise signal integrity. The performance of the inverse multiplexing operation is limited by the lowest performing member of the bearer channels. Provided that all the bearer channels are functional at some minimal rate, the system is operational to inverse multiplex a signal of a higher rate characterized by the mathematical product of the bearer channel rate and the corresponding number of bearer channels.

An object of inverse multiplexing is to exploit the data carrying capacity of lower bandwidth bearer channels to cumulatively serve a higher bandwidth channel. This object is best served if the existence of the inverse multiplex arrangement is more or less invisible outside of the send and receive nodes. Techniques and apparatus are needed to facilitate management of multiple channels in the manner described. This management may involve discriminating and selecting among constituent bearer channels as a step during provisioning, potentially configuring the paths differently, for example determining their differential phase compensation as a function of wavelength and an associated long haul transmission path.

SUMMARY OF THE INVENTION

Exemplary embodiments of the present disclosure are directed to an inverse multiplexing data transmission method. In an exemplary embodiment, the method includes providing a sending and receiving processing nodes coupled by a plurality of bearer channels. The sending processing node includes an inverse multiplexer and the receiving node includes an inverse demultiplexer. A high bit rate signal is supplied to the inverse multiplexer at the sending node. The high bit rate signal is distributed into a plurality of lower bit rate bearer channels having a predetermined channel spacing. The performance characteristics of a subset of the plurality of lower bit rate bearer channels is managed based on a worst performing one of the subset of the plurality of lower bit rate bearer channels. The subset of the plurality of lower bit rate bearer channels is received at the inverse demultiplexer. The data from the subset of the plurality of lower bit rate bearer channels is restored to the high bit rate signal.

In another embodiment, a data communications system for transmitting data at a first bandwidth between first and second signal processing nodes coupled by a plurality of bearer channels, includes an inverse multiplexer operable at one of the nodes to distribute the data over a subset of the bearer channels operating at a lower band, and to recover the data at another of the nodes. The system further includes a controller coupled to the bearer channels and to the inverse multiplexer, operable for selecting the subset of the bearer channels and configuring the subset of the bearer channels so as to normalize transmission parameters of members of the subset with respect to at least one of signal propagation time between the nodes, wavelength bands of the subset of bearer channels, and phase dispersion characteristics of the subset of bearer channels.

BRIEF DESCRIPTION OF THE DRAWINGS

There are shown in the drawings certain arrangements intended as non-limiting examples. Reference should be made to the claims defining the scope of the invention rather than the drawings, wherein:

DETAILED DESCRIPTION

An inverse multiplexing capability is useful in a communication system such as a long haul optical transmission system utilizing a plurality of optical fibers and a plurality of optical channels on each optical fiber. Each of the plurality of channels corresponds to a particular wavelength. Inverse multiplexing can be used to exploit the availability of a plurality of channels to produce a lower number of channels with higher bandwidth.

A transmission design for a high bit rate system may employ inverse multiplexing ("IMUX") where higher data rate signals are de-multiplexed into two or more lower rate signals that are launched into a transmission path included in, for example, an undersea fiber optic transmission system. An IMUX configuration preferably is substantially self contained and operates without external attention, in which case the configuration as viewed from outside its terminal nodes is simply a high rate transmission path. IMUX capabilities are useful in DWDM optical fiber transmission systems. The technique can be applied to legacy systems with modest data rates to provide a high data rate path by exploiting the combined capacity of plural lower data rate paths, namely by coupling an inverse multiplexer and inverse demultiplexer at respective send and receive nodes in the system.

Figure 1:
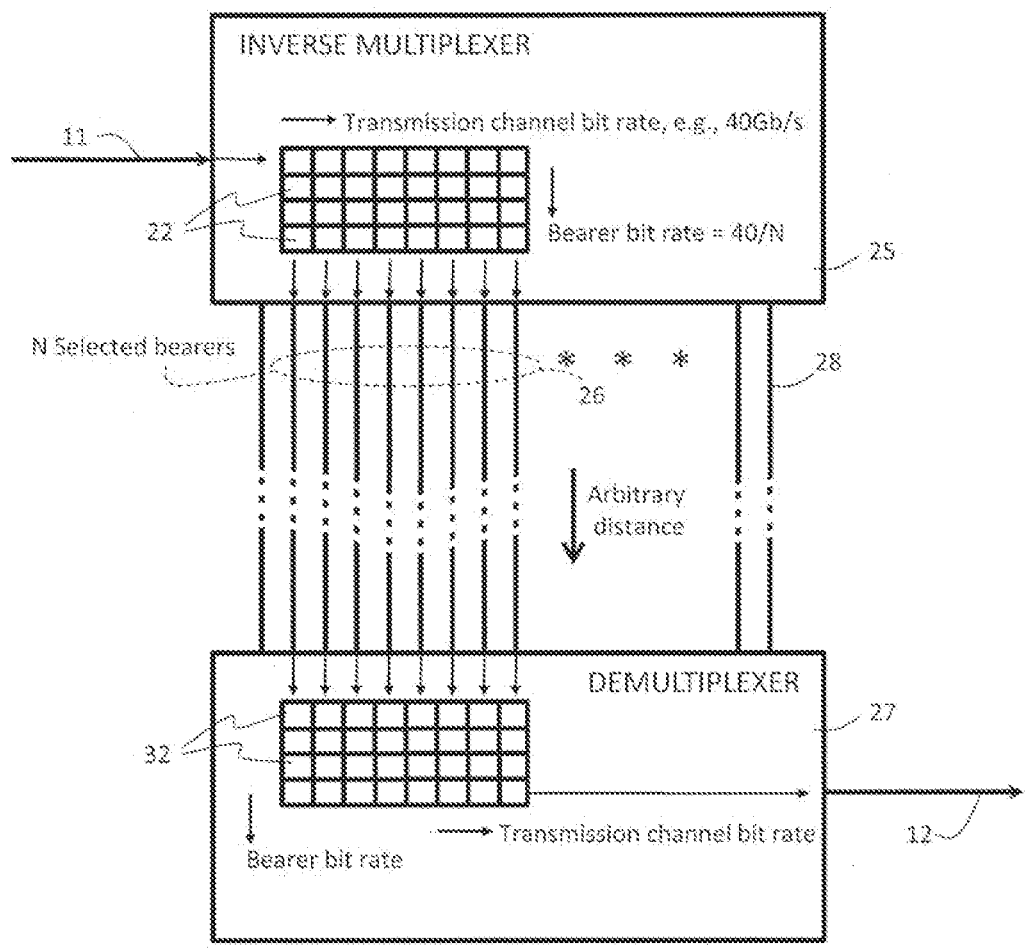
FIG. 1 is a block diagram showing elements of an inverse multiplexer as employed in the subject methods and apparatus.

Referring to FIG. 1, an inverse multiplexer/demultiplexer combination is provided between an input node 11 and output node 12 along a high data rate signal path. The inverse multiplexer is shown graphically to comprise one or more registers 22 operating as a serial to parallel converter at the multiplexer side 25, loaded according to the bit rate of the high data rate signal, illustrated, for example, as a 40 Gb/s signal. The bits of each cyclic frame, of a number of bits equal to the number of bearers signal paths 26, namely eight in the embodiment shown, are transmitted at a lower bit rate and loaded in parallel into registers 32 of a complementary parallel to serial converter at demultiplexer side 27. In the embodiment shown, the bearer paths 22 employed by the IMUX configuration can be a subset of a larger number of potential bearer paths 28 that are provided between the multiplexer 25 and demultiplexer 27.

The lower bit rate is at least a fraction of the higher bit rate, which fraction is the ratio of the number of input channels (in the depicted example one input channel) to the number of bearer paths (in the example, eight, giving a lower bit rate of at least five Gb/s). It is possible to employ bearer channels capable of different bit rates but operation in the specific example of the IMUX arrangement as shown here is such that any bearer channels that are capable of a higher data rate would be operated below their capacity, namely at the same rate as the other bearer channels 26.

The data bits are clocked serially into register or registers 22 synchronously with the bit rate of the signal, i.e., at the original high data rate of the signal at input node 11 (e.g., 40 Gb/s). The bits are gated in parallel as a frame onto the bearer lines or channels 26 and transmitted at the fractional lower rate (e.g., 5 Gb/s in the example). The bits of the transmitted frame are loaded in parallel onto a corresponding register(s) 32 at the demultiplexer 27 and shifted serially out of the register 32 onto the output node or signal line 13. Clock signals for synchronizing the serial and parallel shifting can be derived from the data signals in a serial digital hierarchy (SDH) arrangement in known manner, e.g., using phase locked loops and counters (not shown).

Figure 2:
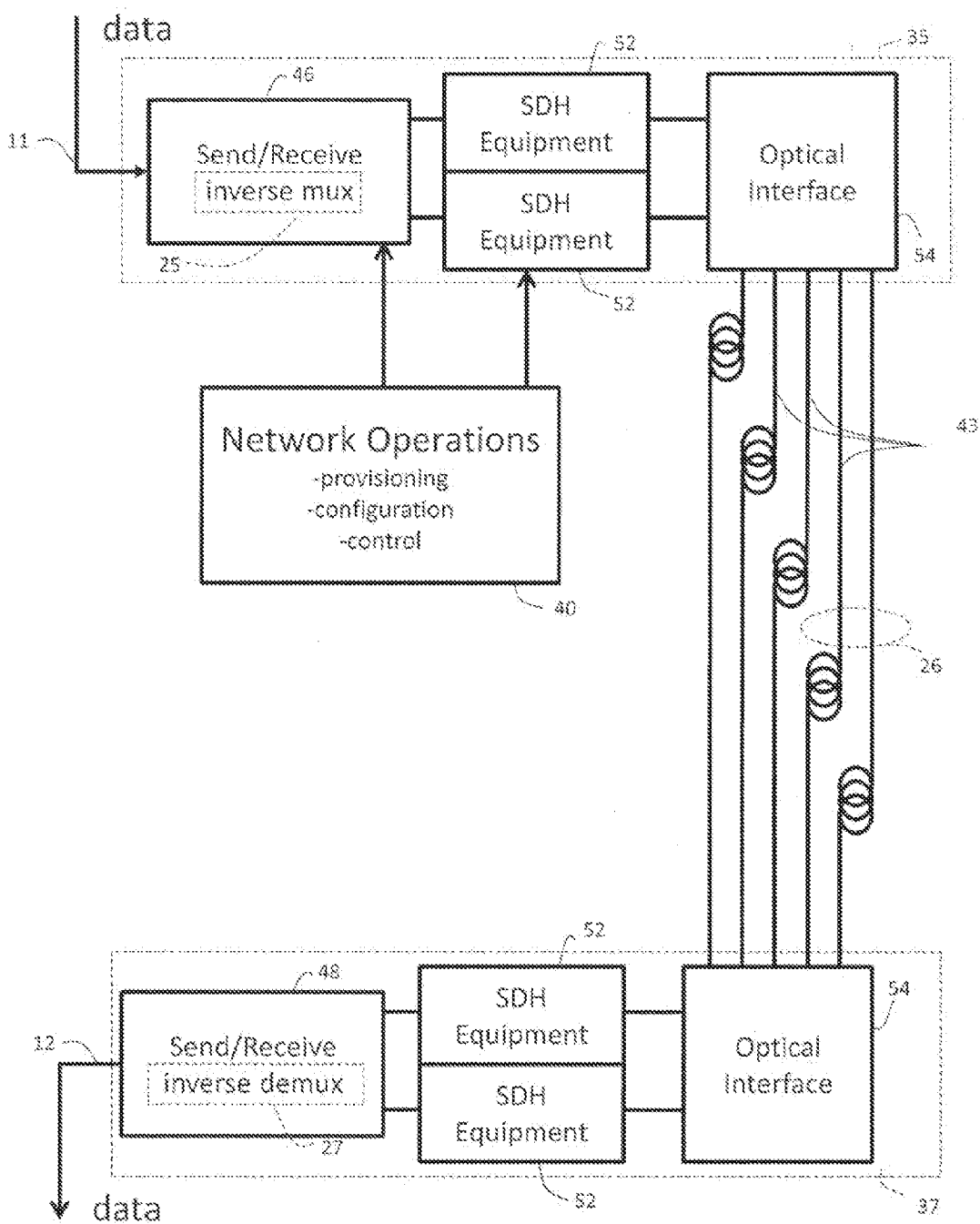
FIG. 2 is a schematic illustration of a transmission network having multiple signal paths.

Referring to FIG. 2, according to an aspect of the present disclosure, the capability of inverse multiplexing is applied at the system architecture and network management levels. Send/receive units 35, 37 includes inverse multiplexer/demultiplexer hardware invoked and configured under control of a network operations control processor 40. The processor 40 may comprise one or more processors and associated programming with outputs coupled to control operations at the send and receive units 35, 37.

The embodiments discussed herein as examples are primarily DWDM based on optical fiber transmission systems utilizing quadrature phase shift keyed (QPSK) pulse code modulation. The send/receive terminal elements 35, 37 are coupled through interfaces configured according to the synchronous optical networking (SONET) and/or synchronous digital hierarchy (SDH) standardized multiplexing protocols to transfer multiple digital bit streams over optical fibers or wavelength division multiplexed channels of optical fibers 43 in a standardized format. It should be appreciated, however, that this disclosure is also applicable to other specific arrangements.

A subset 26 (as mentioned with respect to FIG. 1) of available signal paths, channels or fibers 43 are employed for a given inverse multiplex configuration operating under control of processor 40. One or a plurality of IMUX configurations can be operated at the same time on different selected ones of the signal paths 43. The send node 11 and the receive node 12 might be at any arbitrary distance as indicated in FIG. 1, and may be at terminal ends of a long haul transmission path. The send and receive nodes can both be bidirectional; however the end nodes 11, 12 are shown with the upper end in FIG. 2 denominated as the send node for purposes of discussion. The send/receive terminal element 46 at the send node passes data into and out of the data transmission system and comparable element 48 and the receive node couples the demultiplexed recovered high bit rate signal on towards its ultimate destination. SDH interface elements 52 provide drive signals to optical interface 54, for example containing the DWDM modulators and demodulators. Examples of disclosures concerning the general nature of optical fiber data transmission systems, including inverse multiplexers, can be found, for example, in U.S. Pat. No. 5,771,229—Gavrilovich; U.S. Pat. No. 5,764,405—Alphonsus; U.S. Pat. No. 5,462,622—Bleickardt, etc., the disclosures of which are hereby incorporated by reference.

In the example shown in FIG. 2, the control and management processor 40 is arranged for network management and effects choices and ongoing operational changes, either autonomously or under control of an operator (or both), to manage or improve system performance. Among other functions, the control and management processor 40 is configured to provide provisioning requirements to serve one or more high data rate channels using a subset 26 of the available channels 43. The channels 43 are shown in FIG. 2 as distinct lines, but these lines can also represent distinct channels via the same signal transmission medium, such as a particular channel in a DWDM fiber optic transmission system.

When called upon, control and management processor 40 is configured to provision a required high data rate channel. This may involve a set up procedure to establish a high data rate communication path configured between nodes 11, 12. The control and management processor assigns the subset 26 of available constituent channels 43, to contribute as bearer channels to an inverse multiplex arrangement serving the high data rate channel. As discussed with respect to FIG. 1, a plurality of relatively lower data rate bearing channels 26 satisfy the data rate requirements of one or more relatively higher data rate channels, using an inverse multiplexer/demultiplexer.

The controller 40 is arranged to optimize the arrangement in certain ways. In an exemplary embodiment, the contents of one high data rate channel operating between nodes 11, 12 at 40 Gb/s channel can be distributed by inverse multiplexing into two bearer channels 26 operating at 20 Gb/s, namely at half the rate. These two channels will be treated as one logical channel when determining dispersion compensation and pre-emphasis where these two channels will have the same values of dispersion compensation and launch power. The same techniques can be applied to other combinations of data rates, such as sharing four bearer channels at 10 Gb/s, eight bearer channels at 5 Gb/s, etc. Regardless of how many bearer channels are used, it is advantageous on the system level for the inverse multiplexing arrangements to be functionally invisible. From the standpoint of operator engaged in sending and receiving data, the high data rate channel at 40 Gb/s is one operational logical channel, i.e., one channel as distinguished on the client's side of the transponder interface rather than a combination of lower data rate bearer channels.

In this manner, instead of striving only to employ high data rate bearer channels, an effort is made to employ bearer channels that are equal to one another in transmission characteristics. Thus, channels that perform relatively poorly compared to other channels may be subjected to added signal processing, for example to tighten their dispersion characteristics to support nominal transmission quality at the data rate to be used for all the bearer channels. In the same inverse multiplexing configuration of bearer channels, it may be advantageous to operate below the highest performance possible with other bearer channels. Transmission channels with shorter transmission times may have inserted a delay so that the propagation times of all the channels is approximately the same. The point is to cause all the bearer channels used cooperatively for an inverse multiplexed signal to have substantially equal characteristics. The result is that outside of the inverse multiplex leg between the send and receive nodes, there is little or no attention required to the bearer channels and their characteristics. The inverse multiplex leg operates at the high data rate without further management regarding these bearer channels. If the performance of any of the bearer channels falls below an acceptable operational level, the entire leg fails.

The bearer channels are chosen based on equal or nearly equal transmission characteristics to transmit a high bandwidth signal. These two aspects are cooperative, namely choosing bearer channels that perform nearly equally in the first place, and applying signal processing arrangements to improve the poorer performing channels to perform up to a standard and/or to operate the better performing channels at a standard less demanding than their capabilities. Because the bearer channels are initially chosen based on similar performance characteristics, for example having adjacent wavelength bands on the same fiber, the need is minimized to degrade better performing channels and/or to boost poorer performing channels. As a result, the inverse multiplexing operation optimally exploits a large proportion of possible data carrying channels that perform relatively poorly compared to their counterparts, and also channels with better performance characteristics.

Figure 3:
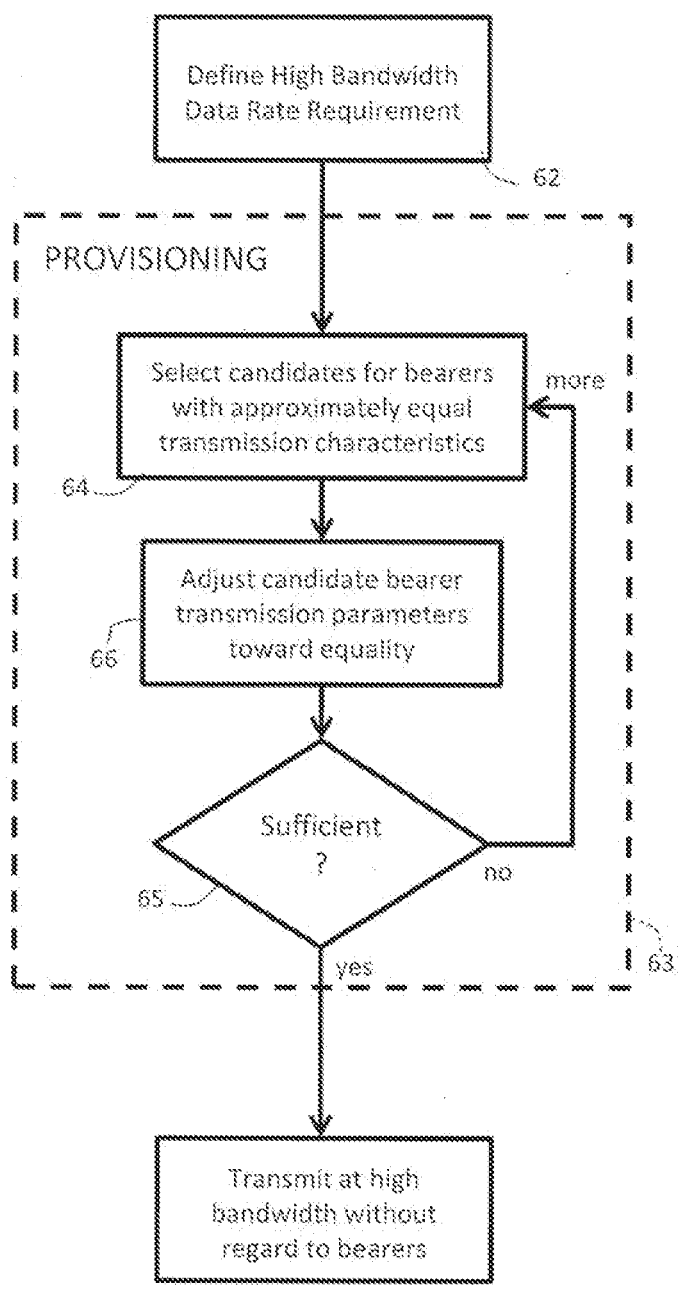
FIG. 3 is a flowchart illustrating assigning selected signal paths as channel bearers in an inverse multiplex arrangement as provided herein.

FIG. 3 is a flow chart illustrating the assignment of selected bearer channels in an IMUX arrangement. The functions of the network operations controller 40 include, among others, provisioning or allocating data capacity as needed within the transmission system. This may comprise allocating a subset 26 of the larger number of available low rate channels 43 as bearer channels in the inverse multiplex arrangement. A high bandwidth data rate requirement is made to the network operations controller 40 at entry point 62, for example being presented by a request from a customer or relayed from a processor located elsewhere in the communications system. Provisioning) generally shown in block 63, includes selection of the subset 26 of bearers from among the candidates, shown in block 64, includes choosing a sufficient number of the low rate channels 43 to handle the desired data rate. This can be handled in a software loop that accumulates the necessary data capacity by incrementally adding bearers, as shown by conditional block 65.

Selection of the subset 26 includes discriminating among the alternatively available low rate channels 43 to select channels that are optimally used together in the inverse multiplexer arrangement to which each one will contribute. This can involve selecting for the closest transmission parameters that are available among defined channels, such as assigning the necessary number from among the available channels while preferentially selecting for those channels that are most similar to one another. For example, the channels are selected based on their wavelength bands so as to choose the group of channels that are closest to one another in their respective wavelengths, thereby minimizing the range of phase delays. The channels are selected and assigned in the loop shown in FIG. 3 containing blocks 64 through 66 until the inverse multiplexer has a data rate at least meeting the requirements dictated at block 62.

In one embodiment, the controller 40 is additionally arranged to configure the selected low rate channels by making adjustments, shown at block 66 in the loop, so that where possible the selected channels are adjusted to render them equal or more nearly equal with respect to transmission characteristics. For example, the selected channels 26 that are assigned to the IMUX can be adjusted for different dispersion compensation with the object of rendering the dispersion characteristics of the bearer channels approximately equal. Therefore, when a logical channel is to be established, the network operations and control element 40 as shown in FIG. 3 applies a set of transmission design and network operation rules to provide: (1) an advantageous configuration, preferably making certain optimization tradeoffs that benefit network operations; and (2) preferably applying available transmission parameter adjustments that enable the high data rate logical channel through nodes 11, 12 to be treated as a single channel as opposed to a number of low data rate physical or wavelength division multiplexed channels.

The low rate bearer signal paths are assigned to the closest wavelength. This reduces the difference in propagation time to the minimum possible. If one fiber and all DWDM channels are available in the example of a 40 Gb/s data input and two bearer channels are assigned, each pair of 20 Gb/s signals is selectively placed by the network operations controller at the closest adjacent wavelengths' supported by transmission system design. Assuming in this example that the wavelengths have a 5 GHz channel spacing, the two bearer channels are assigned to center wavelengths 25 GHz apart. The operations controller refrains from placing channels any farther apart than necessary. However, it is possible that in a system having randomly populated channels that the controller may be required to choose the best alternative available (the least possible channel spacing) under the circumstances presented, for example with an intervening wavelength band already having been committed.

Operations controller 40 treats the set of plural assigned channels (two in this example) as a single entity when subsequently monitoring and logging or reporting, and optionally when adjusting controllable transmission parameters that are applicable to the high rate logical signal path between nodes 11, 12. These parameters include at least dispersion compensation, which generally can be made equal for the two bearer channels because their wavelengths are nearly adjacent and thus, their differential propagation delay is relatively smaller than more widely spaced channels.

In addition to equal dispersion compensation, the two bearer channels preferably are configured to have equal pre-emphasis configuration values, which means equal launch power. The transmission design parameters are thus constrained. Other parameters also can be constrained for equality, for example carrier to sideband ratio, TX/RX optimization routines and the like.

Inasmuch as certain transmission parameters are to be equal, an option is presented as to whether the predetermined value shall be the optimal value for the higher or lower wavelength or an average of the optimal values of the two. In one embodiment, an average is employed. This technique degrades or fails to optimize both bearer channels compared to their individual optimal values, for example for dispersion compensation. However by treating both bearer channels as one logical channel, for example a logical channel having a wavelength of the average of the center wavelengths of the physical bearer channels, the operations controller is able to handle the inverse multiplexed configuration as one logical unit. It is not necessary to test and establish pre-emphasis values and other parameters for each physical channel because the two physical channels are treated as one logical channel.

As described, the configuration and optimization routines need not distinguish between the two physical channels and can treat the two as having attributes equal to their average. In an alternative embodiment, it is possible to employ a characterization of the two bearer channels that is not simply the numeric average of their attributes. In particular, where certain parameters whose difference adversely affects transmission performance, it is possible to skew the average with the goal of improving the worst of the two performing channels. Although the two bearer channels 26 are treated as one, it is apparent that if either channel fails then both channels are inoperative for continued data transmission as configured. Accordingly, test and monitoring capabilities of the operations control unit 40 apply threshold criteria to both bearer channels separately. The performance of the worst channel in a two or more bearer channel configuration is reported to the network operations controller 40 as the performance of the logical channel. The logical channel is declared failed if any one of its constituent bearers 26 has failed.

At the network operations controller 40, the performance of logical channels remains visible (e.g., monitored and logged or reported). The performance of physical channels 26, 43 is subsumed in the average of the member bearer channels grouped by the units in which the bearers serve as members of an inverse multiplexer/demultiplexer. Preferably, alarms that may result in a logical channel failure are not averaged but have thresholds applied to each bearer channel 26. In case of severe alarms there preferably is sufficient information monitored and stored as to separate physical bearer channel performance to enable troubleshooting by technicians who may be able to identify and repair or sequester a physical channel that has been damaged. For this purpose, technical personnel charged with the duty to troubleshoot the path of a signal through one or more logical channels including inverse multiplexers preferably have access to an end-to-end trail model of the entire logical channel, i.e., mapping alarms and error conditions in a manner that enables problems including intermittent problems to be associated with the logical channel at various points in its progress. This enables a logical channel to be disqualified and one or more of its bearer channels employed in new configurations. Or with the benefit of sufficient alarms to discriminate a problem that arises in a given bearer channel, that bearer channel can be taken out of operation.

In each of the these embodiments, the inventive method for data transmission includes providing first and second signal processing nodes, i.e., send and receive nodes 11, 12 operable in a given transmission direction, coupled by a plurality of bearer channels 43, and transmitting data over a subset 26 of the bearer channels 43. Such transmission direction is between the sending one 11 of the signal processing nodes, and the receiving one 12 of the signal processing nodes at which the data is recovered. An inverse multiplexer 25 is coupled into the sending one 11 of the signal processing nodes and an inverse demultiplexer 27 is coupled to the receiving one 12 of the signal processing nodes. These generally operate by converting serial data on a smaller number of channels (normally one channel) to parallel data transmitted concurrently over a larger number of channels (two or more), as generally shown in FIG. 1.

Assuming one input channel, the data applied to the inverse multiplexer 25 defines one logical channel at the relatively high bandwidth at the sending one 11 of the signal processing nodes (which forms an input to the inverse multiplexer), through plural bearer channels 26 into which the inverse multiplexer 25 distributes the data at a relatively lower bandwidth. The inverse demultiplexer 27 collects the data at the lower bandwidth from the bearer channels 26, and restores the data at the relative higher bandwidth at the receiving one 12 of the signal processing nodes (which forms an output from the inverse demultiplexer) and the signal from the logical channel continues along its path.

According to one aspect, the bearer channels are either chosen from a larger number of candidate bearer channels 43 or are configured by making adjustments (or both) so that the bearer channels 26 that are used have similar transmission characteristics. Network configuration and control arrangements, such as a supervisory processor 40, manage the assigned subset 26 of the bearing channels 43 as the cooperating plurality of channels in the inverse multiplex arrangement, wherein the channels together form a logical channel. This isolates the relatively higher bandwidth logical channel data between the terminal nodes 11, 12 from differences between or among the bearing channels 26, 43. One logical channel is obtained between the nodes. The subset of bearing channels are operated as equal bearing channels performing at least as well as a least-performing member of the subset. According to another aspect, the bearing channels are chosen and groups and preferable are subjected to any adjustments that are available, so that all the channels that are grouped as bearers are nearly equal. If the differences between the best and least performing members is held to a minimum, the inverse multiplexer/demultiplexer will extract from the bearers the full data capacity that is possible.

Accordingly, managing the bearing channels comprises selecting the subset 26 of the bearing channels from among the plurality 43 of available channels that might be used as bearing channels, in a manner so that the selection is made to minimize differences in transmission parameters among members chosen for the subset. The parameters for which differences are minimized among the members of the subset 26 of the bearing channel includes at least one of signal propagation times, wavelength bands and phase dispersion characteristics.

Insofar as minimizing a difference in one parameter might cause the difference in a different parameter to be enlarged, the selection of the members of the subset can be made to minimize the differences in transmission parameters considering both transmission parameters, and optionally additional parameters at the same time, i.e., to made the selection according to one or more tradeoffs.

In a practical example, the selection can include defining a minimum practical bandwidth separation between wavelength bands in a wavelength division multiplexed transmission having bearers that operate at different wavelengths. Selection in that case advantageously includes discriminating to minimize wavelength separation, i.e., to choose for members of the subset 26 of bearing channels, adjacent' bands separated from one another by substantially the minimum practical bandwidth separation.

Insofar as there are transmission parameters that might be chosen by grouping channels having predetermined signal processing parameters, or perhaps by adjusting the channels to make their parameters equal, the channels as selected and/or as adjusted may fall in a range of performance levels according to some measure such as data rate or error rate, etc. Inasmuch as the selected bearer channels 26 are to operate in lockstep with one another in the inverse multiplex/demultiplex configuration, using the channels together may require consideration of at least one of improving performance of at least one lower-performing channel, and reducing performance demand on at least one higher-performing channel. However, by choosing or adjusting for relative equality, the lower-performing channel(s) hold back or limit the potential performance of the higher performing channels only to a minimized degree.

The method as described can include choosing for equality and/or adjusting for equality with respect to one or more of phase dispersion compensation, pre-emphasis, launch power, and carrier to side band ratio for the members of the subset of the bearing channels.

The present disclosure encompasses not only methods as described but can be regarded as a data communications system for transmitting data at a first bandwidth between first and second signal processing nodes coupled by a plurality of bearing channels, including an inverse multiplexer operable at one of the nodes to distribute said data over a subset of the bearing channels operating at a lower bandwidth, and to recover the data at another of the nodes. Externally, the system appears as a high bandwidth, high data rate channel between the nodes. Between the nodes, plural bearing channels are coupled between an inverse multiplexer at one node, an inverse multiplexer at the other node, and a controller coupled to the bearing channels and to the inverse multiplexer. The controller is arranged according a stored program running on a processor, or by operator input or by a combination of the two, to select the subset of bearing channels to be used, from among a larger number of candidates, and/or to configure the subset of the bearing channels so as to normalize transmission parameters of members of the subset with respect to at least one of signal propagation time between the nodes, wavelength bands employed, and phase dispersion characteristics.

In an exemplary embodiment, the controller is configured to adjust at least one member of the subset for at least one of phase dispersion compensation, pre-emphasis, launch power, and carrier to side band ratio of transmission of the data through the respective member of the subset of the bearing channels. The controller can be arranged to test the bearing channels or may be coupled to measuring equipment so as to discern the operational characteristics of the channels in connection with configuring or adjusting the channels to render their transmission characteristics substantially normalized and equal. The data transmission ensues between the nodes, through the inverse multiplexer and preferably a synchronous data hierarchy interface coupled for transmission of the data along each of the member bearers, to an output stage at which the original signal is collected from the bearers by an inverse demultiplexer and coupled via the output node to proceed along its way without the inverse multiplexer being apparent except as a minor fixed delay.

The invention having been explained and illustrated with respect to certain advantageous embodiments, additional embodiments will now be apparent to persons skilled in the art. The invention is intended to encompass such additional embodiments and variations insofar as they fall within the scope of the appended claims. Reference should be made to the claims rather than the foregoing embodiments and examples, to determine the scope of the invention in which exclusive rights are claimed.

What is claimed is:

1. A method for data transmission comprising:
   providing a sending and receiving node coupled by a plurality of bearer channels, said sending node including an inverse multiplexer and said receiving node including an inverse demultiplexer;
   supplying a high bit rate signal to the inverse multiplexer at said sending node;
   selecting a subset of lower bit rate bearer channels having a predetermined channel spacing from among a plurality of bearer channels, and wherein the selection is made so as to minimize differences in transmission parameters among the bearer channels chosen for the subset;

clocking bits from the high bit rate signal serially into a plurality of registers wherein the clocking is performed synchronously with a bit rate of the high bit rate signal supplied to the inverse multiplexer at the sending mode;

distributing said high bit rate signal into the subset of lower bit rate bearer channels;

managing performance characteristics of the subset of lower bit rate bearer channels based on a worst performing one of said subset of lower bit rate bearer channels;

receiving, at the inverse demultiplexer, the subset of said plurality of lower bit rate bearer channels; and restoring the data from the subset of said plurality of lower bit rate bearer channels to the high bit rate signal.

2. The method of claim 1, wherein the members of the subset of the bearer channels are selected to minimize differences in at least one of signal propagation times, wavelength bands and phase dispersion characteristics.

3. The method of claim 2, further comprising defining a minimum practical channel spacing of said subset of plurality of lower bit rate bearer channels wherein the members of the subset are chosen as adjacent bands separated from one another by substantially the minimum practical bandwidth separation.

4. The method of claim 1, wherein managing performance characteristics of a subset of said plurality of lower bit rate bearer channels comprises predetermining signal processing parameters for the members of the subset of the bearer wherein the signal processing parameters are predetermined for at least one of improving performance of at least one lower-performing channel, and reducing performance demand on at least one higher-performing channel.

5. The method of claim 4, comprising predetermining at least one of phase dispersion compensation, pre-emphasis, launch power, and carrier to side band ratio for the members of the subset of the bearer channels.

6. A data communications system for transmitting data at a first bandwidth between first and second signal processing nodes coupled by a plurality of bearer channels, including an inverse multiplexer operable at one of the nodes to distribute said data over a subset of the bearer channels operating at a lower band, and to recover the data at another of the nodes, further comprising:

a controller coupled to the bearer channels and to the inverse multiplexer, operable for one of selecting the subset of the bearer channels and configuring the subset of the bearer channels so as to normalize transmission parameters of members of the subset with respect to at least one of signal propagation time between the nodes, wavelength bands of the subset of bearer channels, and phase dispersion characteristics of the subset of bearer channels such that the normalized transmission parameters is based on a worst performing one of the subset of the bearer channels.

7. The data communication system of claim 6, wherein the controller is configured for at least one member of the subset of the bearer channels to adjust at least one of phase dispersion compensation, pre-emphasis, launch power, and carrier to side band ratio of transmission of the data through the respective member of the subset of the bearer channels.

8. The data communication system of claim 7, further comprising a synchronous data hierarchy interface coupled for transmission of the data along each of the members, including an output stage responsive to the controller.

9. A method for data transmission comprising:

providing a sending and receiving node coupled by a plurality of bearer channels, said sending node including an inverse multiplexer and said receiving node including an inverse demultiplexer;

supplying a high bit rate signal to the inverse multiplexer at said sending node;

selecting a subset of lower bit rate bearer channels having a predetermined channel spacing from among a plurality of bearer channels, and wherein the selection is made so as to minimize differences in transmission parameters among the bearer channels chosen for the subset;

clocking bits from the high bit rate signal serially into a plurality of registers wherein the clocking is performed synchronously with a bit rate of the high bit rate signal supplied to the inverse multiplexer at the sending mode;

distributing said high bit rate signal into the selected subset of lower bit rate bearer channels;

managing performance characteristics of the subset of lower bit rate bearer channels based on a worst performing one of said subset of lower bit rate bearer channels;

receiving, at the inverse demultiplexer, the subset of said plurality of lower bit rate bearer channels; and restoring the data from the subset of said plurality of lower bit rate bearer channels to the high bit rate signal.

* * * * *